United States Patent [19]
Bull et al.

[11] Patent Number: 5,136,295
[45] Date of Patent: Aug. 4, 1992

[54] AIRBORNE FIBER OPTIC DECOY ARCHITECTURE

[75] Inventors: James G. Bull, Issaquah; Michael de la Chapelle, Bellevue; Bernard J. Lamberty, Kent, all of Wash.

[73] Assignee: The Boeing Company, Seattle, Wash.

[21] Appl. No.: 699,748

[22] Filed: May 14, 1991

[51] Int. Cl.$^5$ .............................................. G01S 7/38
[52] U.S. Cl. ..................................................... 342/15
[58] Field of Search ......................................... 342/15

[56] References Cited

U.S. PATENT DOCUMENTS

| | | | |
|---|---|---|---|
| 3,897,028 | 7/1975 | Doellner | 244/3.1 |
| 3,924,232 | 12/1975 | Burdi et al. | 342/54 |
| 4,149,166 | 4/1979 | Null | 342/13 |
| 4,439,767 | 3/1984 | Hefley et al. | 342/14 |
| 4,808,999 | 4/1989 | Toman | 342/15 |

FOREIGN PATENT DOCUMENTS 61-33037 2/1986 Japan .

OTHER PUBLICATIONS

"Optically Powered Sensors for EMI Immune Aviation Sensing Systems"; by Paul Bjork and Jim Lenz; SPIE vol. 1173 Fiber Optic Systems for Mobile Platforms III (1989); Honeywell Systems and Research Center, Minneapolis, Minn., pp. 175–186.

*Primary Examiner*—T. H. Tubbesing
*Attorney, Agent, or Firm*—Joan H. Pauly

[57] ABSTRACT

One or more decoys (22) are towed by an aircraft (18) to confuse hostile radar. The tow lines (20) to the decoys (22) include fiber optic components which optically transmit to the decoys (22) both radio frequency signals for retransmission to hostile radar (24), and direct current power. The fiber optic components absorb strain forces imposed by towing the decoys (22). Multiple decoys (22) are deployed at varying distances from the aircraft (18) to increase the overall range of frequencies covered by the system, simulate a plurality of false targets, or accomplish angle gate deception. The deception may be accomplished by transmitting signals from the decoys in sequence and can be enhanced by dynamically varying the power levels of the decoy transmitting antennas. The fiber optic components may be separate optical fibers deployed separately or joined together for simultaneous deployment. The preferred configuration is a single optical fiber with coaxial inner and outer cores. The decoy preferably has a transmitting antenna in the form of a simulated biconical dipole. In one embodiment, both halves of the dipole are simulated by a set of fins. In another embodiment, the forward half is simulated by a truncated cone.

28 Claims, 11 Drawing Sheets

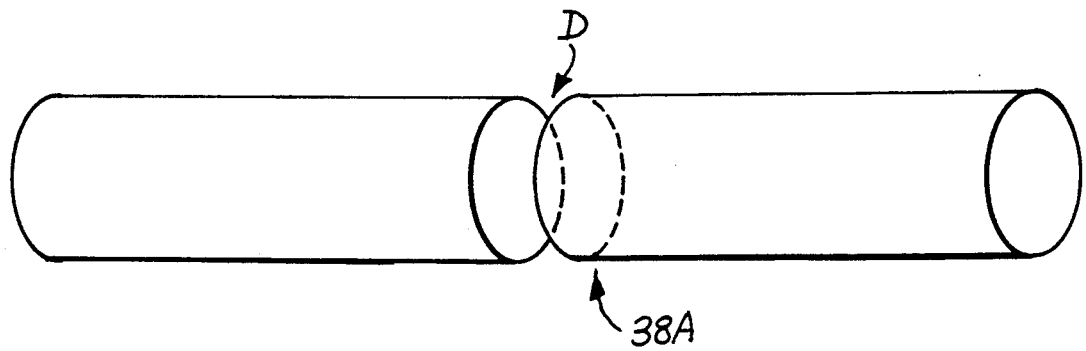
Fig. 5A
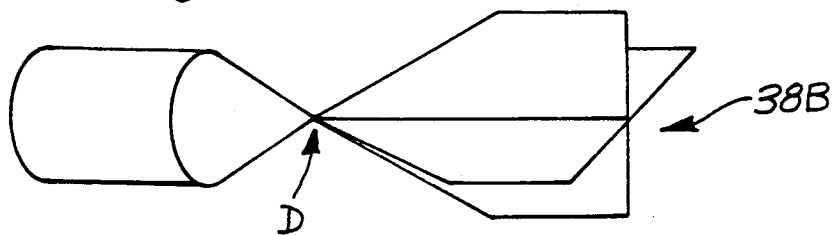
Fig. 5B
Fig. 5D
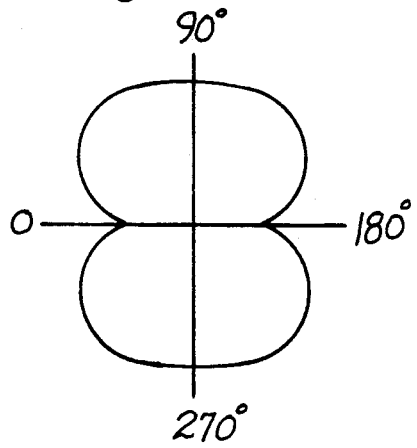
Fig. 5C
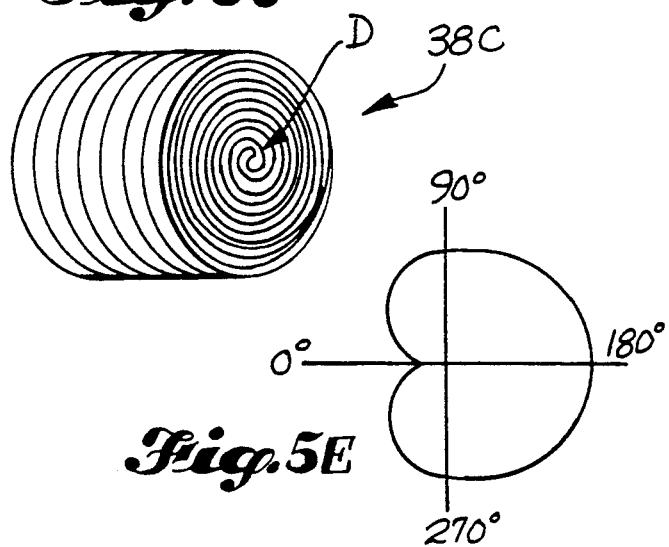
Fig. 5E

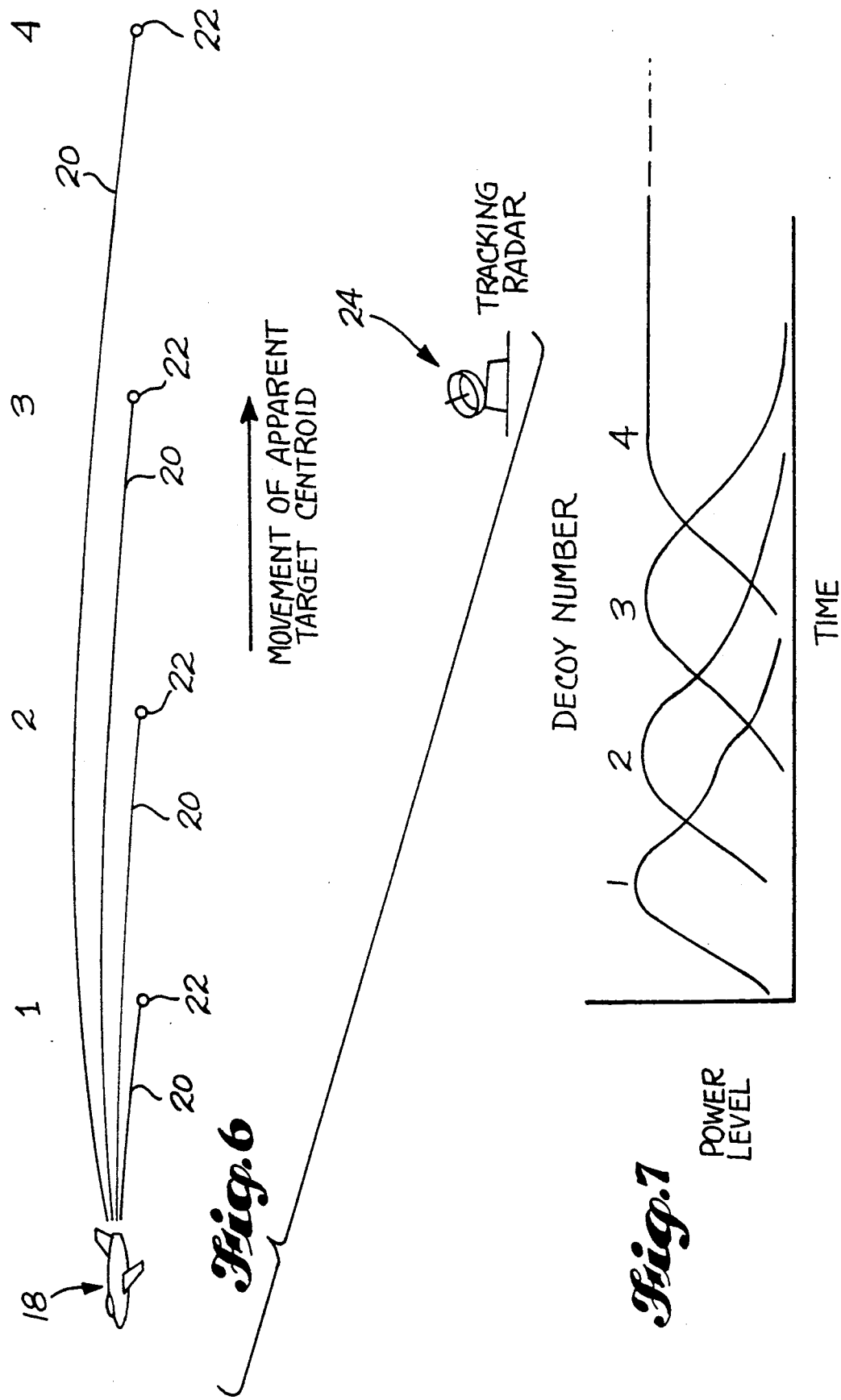

REFRACTIVE INDEX PROFILE

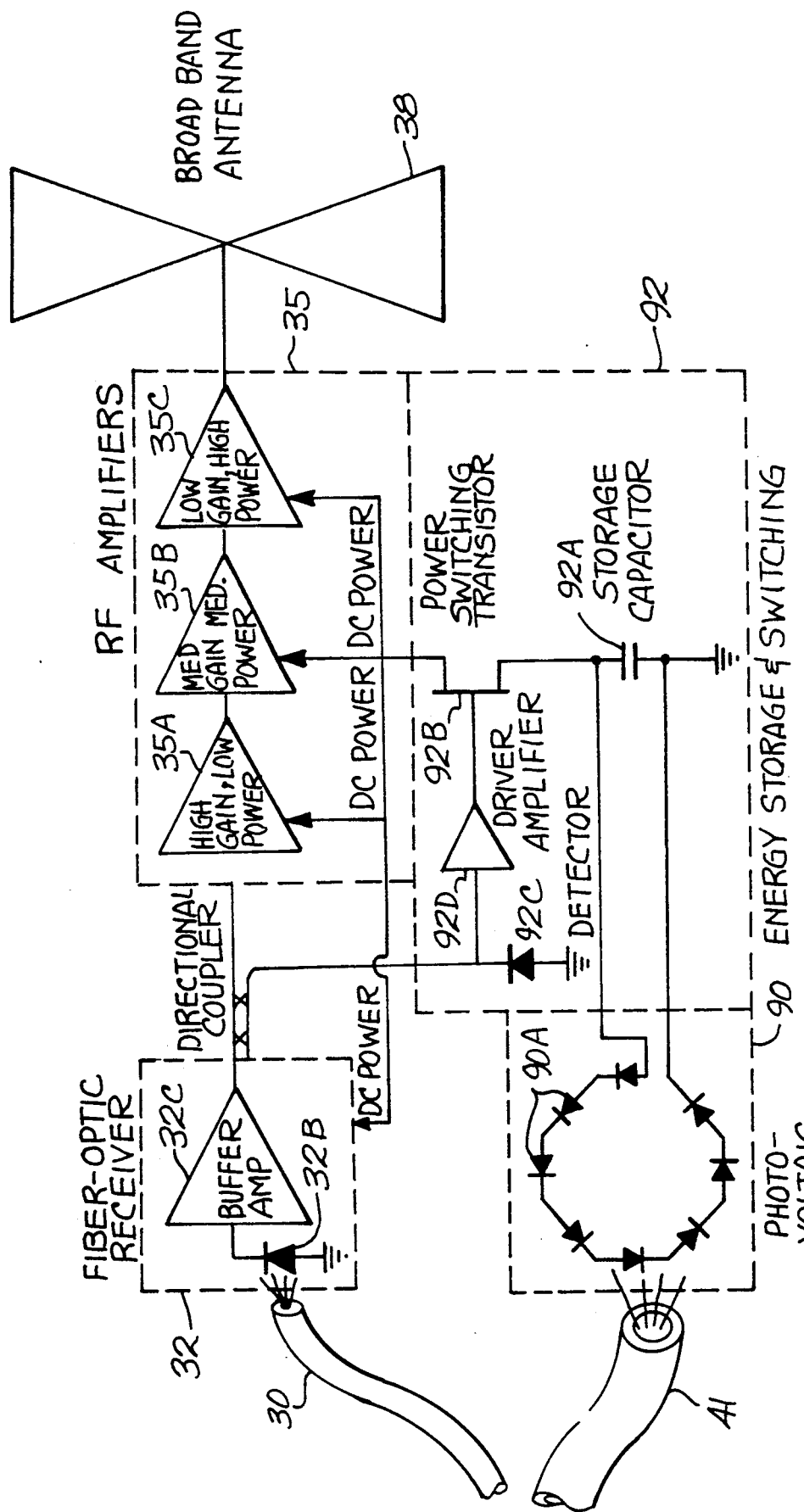

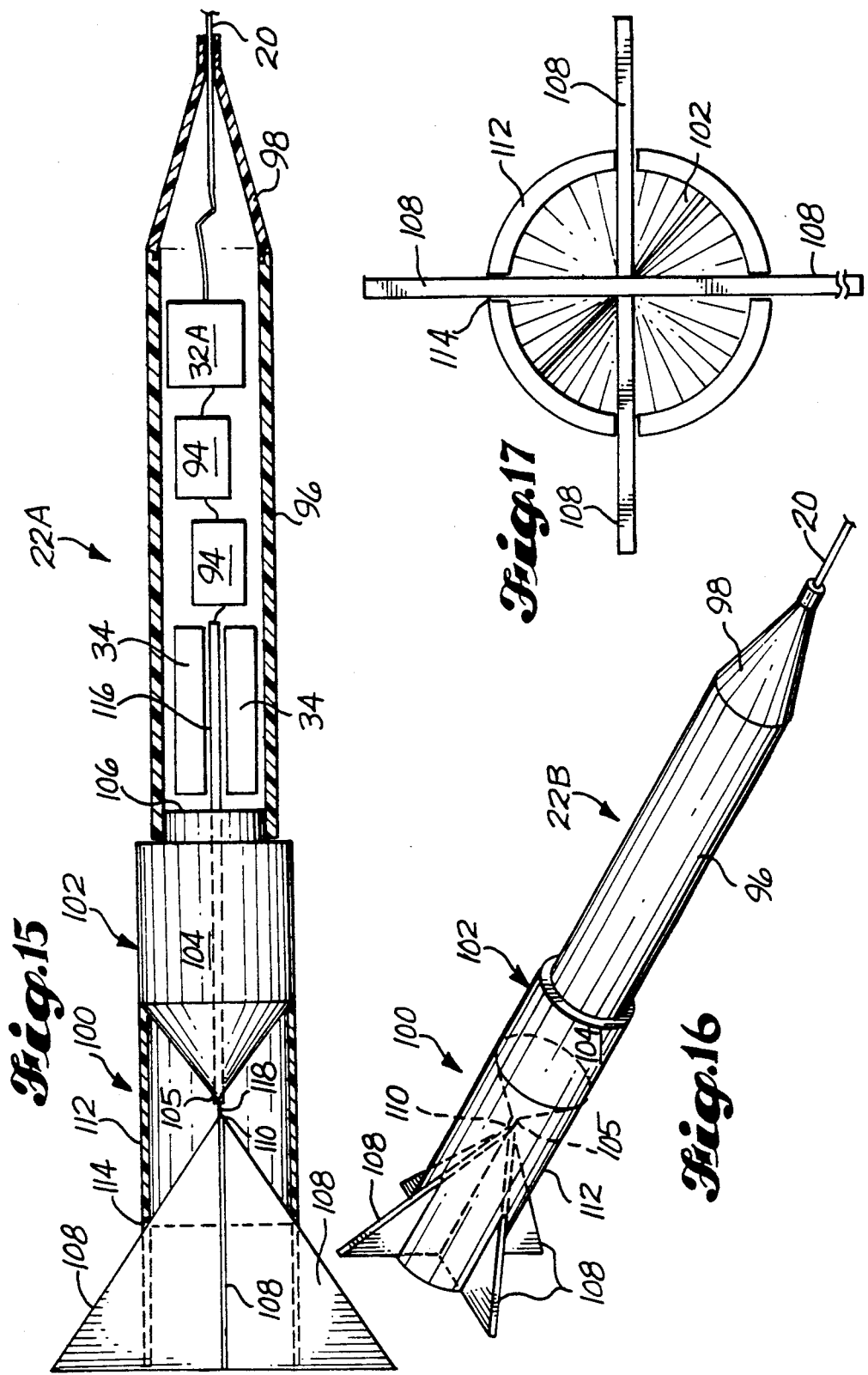

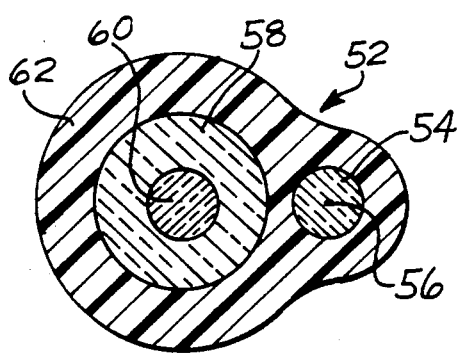
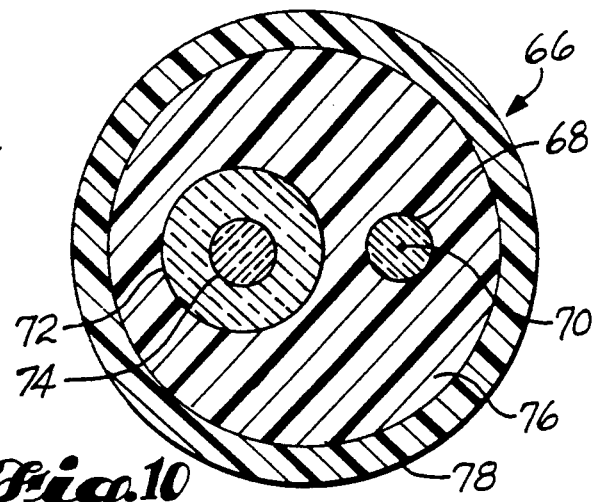
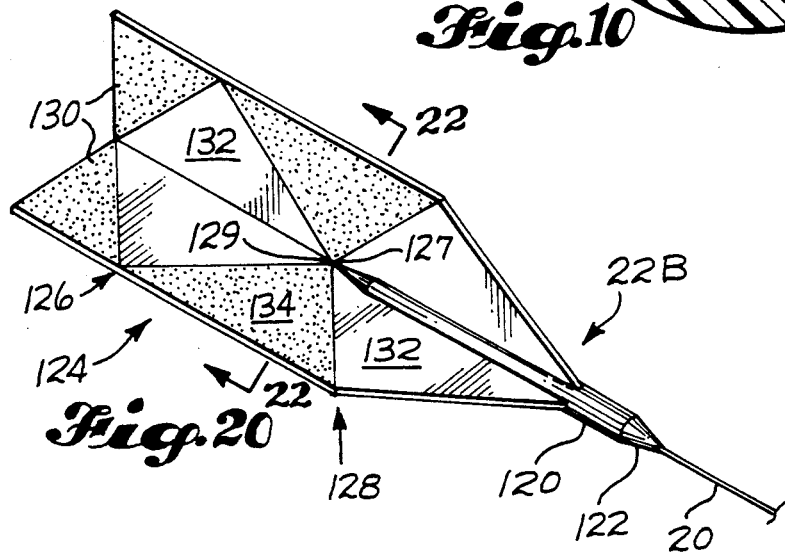
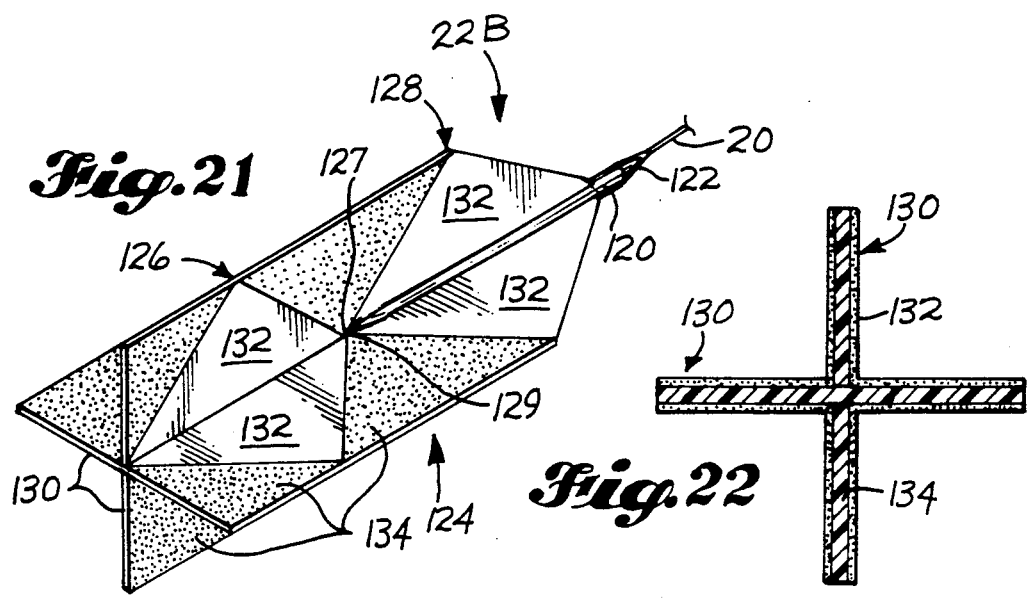

AIRBORNE FIBER OPTIC DECOY ARCHITECTURE

DESCRIPTION

1. Technical Field

This invention relates to systems carried by aircraft to confuse hostile radar by generating false targets. More particularly, it relates to towing a decoy with a fiber optic cable that optically transmits radio frequency signals and direct current power to the decoy, the use of multiple decoys to increase signal bandwidth or to create deception as to the angular location of the aircraft or the number of aircraft, and biconical dipole antenna configurations for the decoys.

2. Background Information

Military aircraft that penetrate hostile air space become targets for radar directed weapons, such as antiaircraft cannon fire, guided missiles, and airborne fighter interceptors. Systems for countering hostile radar are necessary in order to avoid intercept. One approach to providing such a counter system is to mimic the hostile radar's transmission to generate a false target or targets to confuse the hostile radar. The broad area of mimicking the hostile transmission is known as "spoofing".

One type of spoofing is range gate pull-off. This method involves reception of radar signals by repeater deception jammers and retransmission of the signals delayed in time. Increasing the time delay steadily, from retransmission to retransmission, causes the target echo to appear to move away from the target itself. This is effective when the tracking radar is of a type which places a tracking range gate that centers on an echo from the target and automatically follows it as the target moves in range. If a repeater generates a stronger echo than that of the target itself, and delays the generated echo in time, the tracking range gate will tend to lock onto the repeater signal instead of the echo from the target.

Another form of spoofing that works in a manner similar to range gate pull-off is known as Doppler (velocity) gate pull-off. This type of spoofing is effective when the hostile radar is of a type which tracks targets in Doppler filter banks. The radar signal is received by the repeater and translated in frequency and retransmitted. As in the case of range gate pull-off, if the retransmitted signal is stronger than the echo of the target itself, the hostile radar will tend to lock onto the repeater signal, and the target echo will appear to move away from the actual target.

Most repeater methods for confusing hostile radar depend on a receiver and signal processing system on the aircraft to intercept signals from the hostile radars and take appropriate action, and on an on-board antenna for transmitting a false echo. The receiver/signal processor sorts out the frequency of the intercepted signal and determines the radar type and intended mission. The hostile signal can be stored, delayed and/or Doppler shifted, and retransmitted to appear to the radar as an echo from a real target, delayed in range from the real target, i.e. at a greater range than the real target. Sophisticated systems make use of high fidelity memories to store and retransmit an exact replica of the received signal. This type of high fidelity capability makes it possible to mimic the radar exactly even when the radar impresses sophisticated modulation on the signal.

A repeater jammer which spoofs radar by simply delaying the retransmission in time to create range deception or changing the frequency of retransmission to create velocity deception has a significant limitation in that the signal is emanated from the aircraft being defended. Therefore, there is no spoofing of spatial angular information regarding the target's whereabouts. A known technique for overcoming this limitation is to tow the repeater transmitter behind the aircraft. This technique is effective for spoofing spatial angular information but, in current conventional technology, has presented a number of problems. If the repeater is an active transmitter, it must be provided with power through a link between the aircraft and the repeater. The receiver and signal processing equipment are relatively expensive, complex, and heavy and, thus, are usually located on board the aircraft. Therefore, radio frequency (RF) signals are sent over a transmission line from the aircraft to the repeater. The best transmission line for transmitting RF signals is normally coaxial cable. Such cable has a number of drawbacks. It is heavy and bulky and has a high loss rate at the frequencies commonly used by intercept radars. These drawbacks preclude the use of long lengths of coaxial cable (e.g., longer than 100 meters) for towing a repeater transmitter. The limitation on the length of the link between the repeater and the aircraft limits the angular deception that can be achieved with conventional towed repeaters.

There are additional disadvantages to the use of metallic wire cables for transmitting RF signals and power to a towed repeater. The cables themselves can have a significant radar cross section at certain aspect angles. This characteristic is particularly disadvantageous when the towing aircraft is a stealthy airoraft with a low radar cross section. Longer metallic wire cables can also present a navigation hazard to other airoraft flying in the vicinity of the protected aircraft. In addition, an electromagnetic pulse could induce a significant amount of energy in such a cable and damage components on board the aircraft or the decoy.

Fiber optic technology makes possible long distance transmission of radio frequency (RF) energy over lightweight optical fibers. The transmission of the energy can be accomplished very efficiently since optical fibers are capable of high bandwidth bidirectional transmission of RF signals with very low loss. Fiber optic technology has been used in various fields. One known use is in connection with fiber optic guided missiles. The deployment of such missiles has demonstrated that it is possible to pay out long lengths of optical fiber from the missiles. Lengths of optical fiber up to twenty kilometers have transmitted signals from a guided missile to a ground station. The use of fiber optic technology in connection with guided missiles has also helped spur development of high strength optical fibers with pull strengths exceeding 400 kpsi (thousand pounds per square inch). This is more than the tensile strength of a steel wire. An ordinary commercial grade glass fiber has about 100 kpsi proof strength. U.S. Pat. No. 4,808,999, granted Feb. 28, 1989, to D. Toman, discloses a towed decoy adapted to be towed behind an airoraft. Signals are transmitted to the decoy from the airoraft by a fiber-optic cable. The cable is described as preferably being incorporated at the time of manufacture directly into a larger cable used for towing the decoy. Receiving apparatus on the aircraft generates a desired excitation signal, which may be a distorted replica of the received radar signal, and modulates the signal upon a laser transmitter. The modulated laser signal is transmitted to the decoy via the fiber-optic link. A laser receiver on board the decoy demodulates the laser signal and transmits a derived RF signal to a transmitter on the decoy which amplifies the signal and transmits it via an antenna. Direct current energy is supplied to the decoy electrical components by a battery on board the decoy. Toman states that the techniques generator on board the aircraft may produce any number of desired deception techniques, including velocity pull-off and range pull-off.

DISCLOSURE OF THE INVENTION

A subject of the invention is a system for confusing hostile radar to protect an airborne platform. According to basic aspect of the invention, the system comprises a receiving antenna, a processor, and a laser transmitter on board the platform. The antenna is configured to receive radio frequency signals from hostile radar. The processor generates a radio frequency retransmission signal in response to the received radio frequency signals. The transmitter is linked to the processor to generate an optical signal representative of the retransmission signal. The system also includes a decoy deployable to be towed by the platform. A fiber optic cable interconnects the platform and the decoy. The cable provides a structural link for towing the decoy and a communications link for transmitting the optical si9nal to the decoy. An optical receiver and a transmitting antenna are located on board the decoy. The receiver is connected to the cable to receive the optical signal from the cable. The transmitting antenna is connected to the receiver to transmit a radio frequency signal to the hostile radar in response to the optical signal. As used herein, "fiber optic cable" is intended to mean a cable that includes one or more optical fibers that carry essentially all of the loads imposed by towing the decoy, and may also include nonstructural elements, such as a buffer, a filler, and/or a lightweight sheath to protect the cable from the environment.

In the above-described system, the preferred form of the transmitting antenna is a simulated biconical dipole in which a plurality of fins simulate one-half of a bicone. The system may comprise a plurality of decoys deployable to be simultaneously towed by the platform.

According to another basic aspect of the invention, a system for confusing hostile radar to protect an airborne platform comprises a receiving and signal processing subsystem and a laser transmitter on board the platform. The subsystem receives radio frequency signals from hostile radar and generates a radio frequency retransmission signal in response to the radio frequency signals. The transmitter is linked to the subsystem to generate an optical signal representative of the retransmission signal. A decoy is deployable to be towed by the platform. A cable link interconnects the platform and the decoy. The link includes first and second fiber optic components for optically transmitting the optical signal and power, respectively, to the decoy. An optical receiver on board the decoy is powered by the power from the cable link and is connected to the cable link to receive the optical signal from the cable link. A transmitting antenna, also on board the decoy, is connected to the receiver to transmit a radio frequency signal to the hostile radar in response to the optical signal. The system may also have additional features. These include, for example, the preferred transmitting antenna configuration and the plurality of decoys described above. In addition, t he fiber optic components may provide a structural link between the platform and the decoy for towing the decoy.

The fiber optic components of the system may take various forms. In a preferred embodiment, the cable link comprises a coaxial optical fiber having an inner core, and an outer core surrounding and coaxial with the inner core. The first and second fiber optic components comprise the inner and outer cores, respectively. This preferred feature of a coaxial optical fiber has the advantages of simplifying the structure of the cable link and eliminating any need for buffers or fillers to separate discrete optical fibers. In addition, the use of a coaxial optical fiber facilitates the provision of the structural link in the form of the fiber optic components of the cable link.

Alternatively, the fiber optic components may comprise two separate optical fibers. These two fibers may be joined to be deployed together, or may be independently deployable. In the former case, the manner in which the fibers are joined together can be varied. In one embodiment, the separate optical fibers are joined by a buffer and together provide a structural link between the platform and the decoy for towing the decoy. In another embodiment, the cable link comprises the two separate optical fibers and a separate strain component to absorb strain forces imposed by towing the decoy.

Another subject of the invention is a method of confusing hostile radar to protect an airborne platform. In its referred form, the method basically comprises providing a plurality of decoys, each of which has an antenna. Each decoy is interconnected with the platform by a cable link including a fiber optic component. The decoys are deployed to be simultaneously towed by the platform, at varying distances from the platform, by means of the cable links. On board the platform, radio frequency signals are received from hostile radar and processed to generate radio frequency retransmission signals. The retransmission signals are optically transmitted from the platform to the decoys via the fiber optic components. The retransmission signals are transmitted to the hostile radar via the antennas on board the decoys. The method preferably further comprises allowing the fiber optic components to absorb strain forces imposed by towing the decoys and/or optically transmitting direct current power from the platform to the decoys via the fiber optic components.

The retransmission signals may be transmitted to the hostile radar from the different decoys simultaneously, or from different decoys at different times. Similarly, the same retransmission signal may be transmitted from each decoy, or different decoys may transmit different retransmission signals. The determination of the precise nature of the retransmission signal from each decoy is made on the basis of the nature of the hostile radar and the spoofing or other confusing technique that it is desired to accomplish. For example, retransmission signals in different frequency ranges may be transmitted from different ones of the decoys. This makes it possible to cover an overall range of frequencies greater than the frequency range corresponding to any one of the decoys. Another example is the tailoring of the retransmission signals to create a plurality of false targets. A still further example is the transmitting of the retransmission signals in sequence to accomplish angle gate deception of the hostile radar. This type of deception may be enhanced by dynamically varying power levels of the antennas.

Still another subject of the invention is a transmitting device to be towed behind an airborne platform. According to an aspect of the invention, the device comprises a housing having a forward end portion attachable to a tow line. An optical receiver is carried by the housing and is positioned to receive, from the tow line, optically transmitted radio frequency signals. A transmitting antenna is also carried by the housing and is connected to the optical receiver. The antenna includes a plurality of fins arranged to simulate a cone having a forwardly-pointing apex. The overall configuration of the antenna simulates a biconical dipole.

The receiver is preferably powered by optically transmitted power from the tow line. This preferred arrangement eliminates the need for batteries on board the decoy to power the receiver. The elimination of batteries, in turn, helps to minimize the size and weight of the decoy and, thereby, facilitates the use of optical fibers as structural links to absorb the strain forces imposed by towing the decoy. The use of fiber optic structural links makes it possible to dispense with auxiliary strengthening cables and to minimize the weight and cross section of the link between the decoy and the platform. The elimination of batteries also simplifies operational considerations relating to the decoy by avoiding problems related to battery storage life and squibbing.

The structural details of the antenna may take various forms. In one embodiment, the antenna comprises a truncated cone formed by a cylinder terminating in a cone With a rearwardly-pointing apex aligned with the forwardly-pointing apex. The truncated cone and the fins together have the overall configuration simulating a biconical dipole. In another embodiment, the antenna comprises a second plurality of fins arranged to simulate a cone having a rearwardly-pointing apex aligned with the forwardly-pointing apex. The pluralities of fins together have the overall configuration described above. In its preferred form, this embodiment comprises a plurality of plates extending along and radially outwardly from a longitudinal axis. The plates together have a spoke-like cross section. The plates include conductive portions that form the pluralities of fins, and dielectric portions between the conductive portions to help support the conductive portions. This form of the antenna has the advantage of helping to maximize the reduction in size of the decoy.

The invention has a number of major advantages. One such advantage is that it makes possible the implementation of a full range of protective techniques in a cost effective manner. The invention provides a means for carrying out a number of spoofing techniques effectively without creating navigation hazards. The spoofing techniques include angular deception, which has been difficult to accomplish using known systems. The invention also provides a ready means for accomplishing the offensive tactic of creating multiple false targets. The invention is highly versatile and is suitable for use on a wide variety of types of airborne platforms and for spoofing a wide variety of types of radar. By use of the invention, a single airborne platform can readily protect itself against most radar directed weapons. The invention also avoids the problems that have been associated with the use of metallic wire cables, such as coaxial cable. The optical fibers that are employed in the practice of the invention are very lightweight and have very small diameters and, therefore, negligible radar cross sections. The optical fibers have very low RF transmission loss and are immune to electromagnetic interference and pulses. Since the fibers can simply break off should a towed decoy or its tow line snag on an object, such as another airborne platform or a power line, the deployment of the decoy does not present any navigation or ground hazard.

The features of the invention cooperate with each other to make it possible to deploy extremely small, lightweight, and inexpensive decoys without sacrificing effectiveness. The transmitting device of the invention is simple in structure and has minimum size and weight and very low drag characteristics. The device operates well over a wide frequency band and, thus, can cover most radar bands. The fin arrangement on the device contributes to the desirable size, weight, and drag characteristics and can also act to stabilize the device in flight.

These and other advantages and features will become apparent from the detailed description of the best modes for carrying out the invention that follows.

BRIEF DESCRIPTION OF THE DRAWINGS

In the drawings, like element designations refer to like parts throughout, and:

FIGS. 5A, 5B, and 5C are partially schematic pictorial views of three types of antennas that may be incorporated into the decoy of the invention, including a dipole antenna, a simulated biconical dipole antenna, and a spiral extended over cavity antenna, respectively.

FIGS. 5D and 5E are generalized graphs showing typical radiation patterns of the antennas shown in FIGS. 5B and 5C, respectively.

FIG. 6 is a simplified pictorial view of an aircraft towing a plurality of decoys in accordance with the invention.

FIG. 7 is a graph illustrating the retransmission power levels from the decoys shown in FIG. 6 designed to accomplish angle deception.

FIGS. 9 and 10 are cross-sectional views of two embodiments of the fiber optic cable link of the invention.

FIG. 14 is a schematic diagram showing the decoy components of FIG. 13 in greater detail.

FIG. 15 is a partially schematic elevational view of a first embodiment of the decoy, with parts shown in section.

FIG. 16 is a pictorial view of the decoy shown in FIG. 15.

FIG. 17 is a rear end view of the decoy shown in FIG. 15.

FIGS. 20 and 21 are pictorial views of the decoy shown in FIG. 19.

FIG. 22 is a rear end view of the decoy shown in FIG. 19.

BEST MODES FOR CARRYING OUT THE INVENTION

Figure 8:
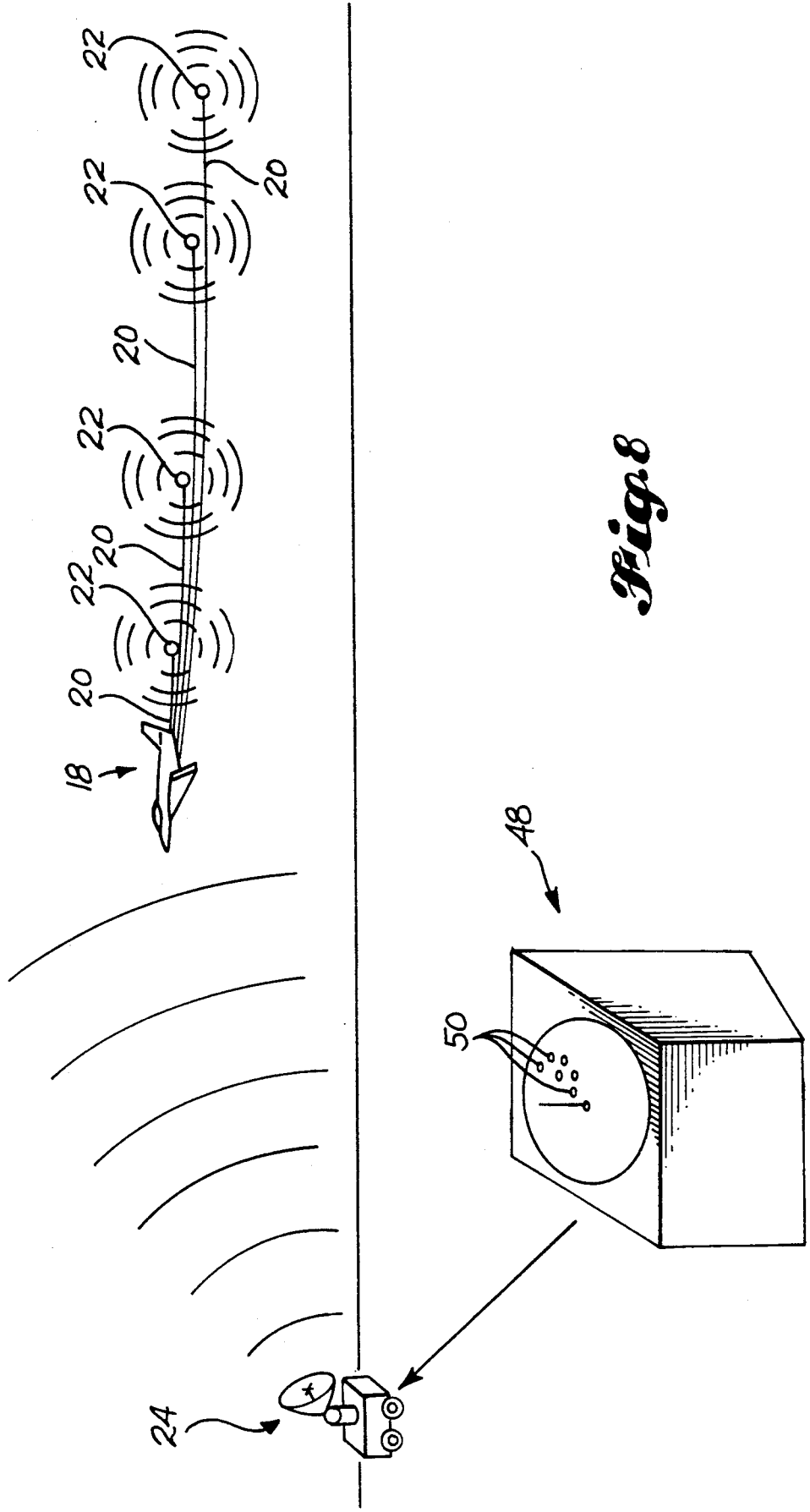
FIG. 8 is similar to FIG. 6 except that it illustrates retransmissions from the decoys to create multiple false targets.

The drawings illustrate apparatus that is constructed in accordance With the invention and that constitutes the best modes of the apparatus of the invention currently known to the applicants. The drawings also illustrate the best modes for carrying out the method of the invention currently known to the applicants. In FIGS. 3, 4, 6, and 8, the invention is shown being used in connection with an aircraft 18 to confuse radar carried by a missile 23 (FIG. 3) or ground-based hostile radar 24 (FIGS. 4, 6, and 8). The illustrated uses are only some of the situations in which the invention may be used to great advantage. It is intended to be understood that the invention may also be used advantageously in connection with other types of airborne platforms and other types of hostile radar.

Figure 1:
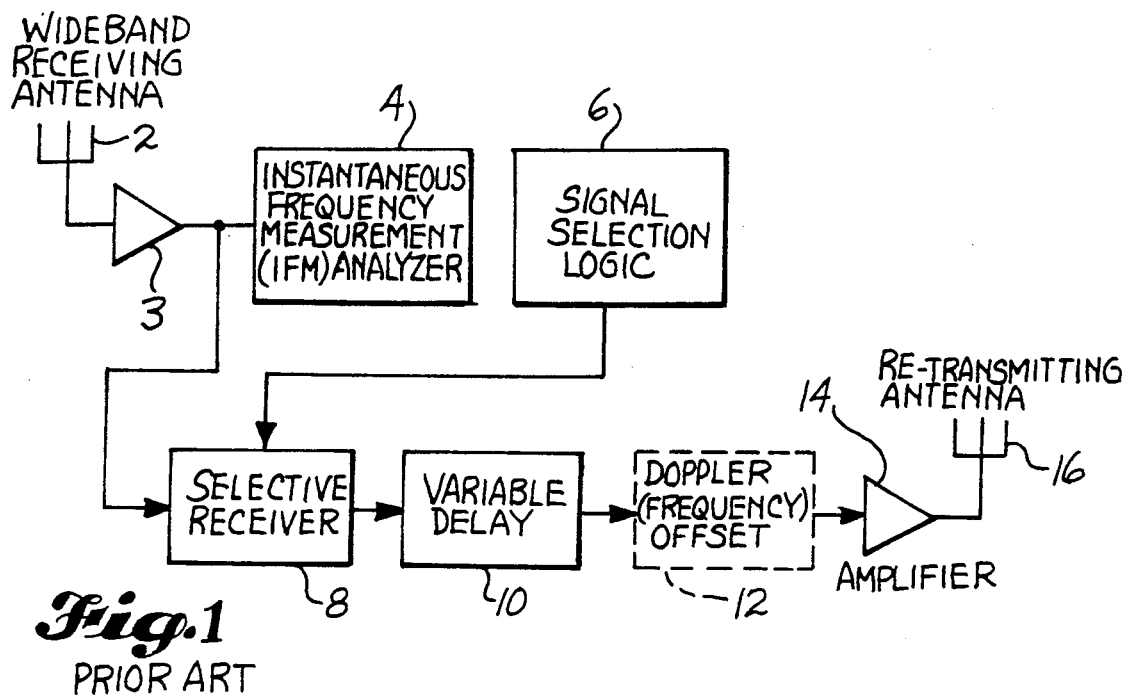
FIG. 1 is a schematic diagram of a known type of system for spoofing hostile radar.

FIG. 1 is a schematic diagram of a typical arrangement of the type of prior art spoofing apparatus discussed above. As shown, the entire spoofing system is carried on board the protected aircraft. The system includes a wide band receiving antenna 2 that receives hostile radar transmissions. The received signals are boosted by a broadband amplifier 3 and transmitted to an instantaneous frequency measurement analyzer 4. The analyzer 4 sorts out the pulses from many radars simultaneously illuminating the aircraft to determine the frequencies of the received signals. Signal selection logic 6 uses the parameters of each radar, such as frequency, pulse repetition frequency, pulse width, and scan rate, to identify the radar type and mode of operation and determine whether or not to perform spoofing. When it is determined that a particular radar should be spoofed, the signal selection logic 6 sends a gating signal to a selective receiver 8. The receiver 8 then selectively amplifies the signal to be spoofed. The radar signal amplified by the receiver 8 is altered in accordance with the desired spoofing technique and fed to a transmitting antenna 16 via an amplifier 14. The amplifier 14 amplifies the altered signal to the power level to be radiated from the antenna 16. Block 10 in FIG. 1 represents a variable delay circuit for processing the signal to accomplish range gate pull-off. Block 12 (shown in broken lines in FIG. 1) represents the alternative of Doppler offset for accomplishing Doppler (velocity) gate pull-off.

In most cases, the system of the invention incorporates the elements of the known system shown in FIG. 1, with some modifications. The primary modification is the positioning of the transmitting antenna 6 on board a decoy, rather than on board the protected airborne platform. The amplifier 14 is also generally relocated to the decoy. The signal processing elements 10, 12 could be replaced or supplemented by other known processing devices and/or additional elements for practicing particular aspects of the method of the invention, discussed further below. At present, it is contemplated that systems in accordance with the invention will maintain the elements 2-8 of FIG. 1 and appropriate signal processing elements as parts of the system carried on board the protected airborne platform.

Figure 2:
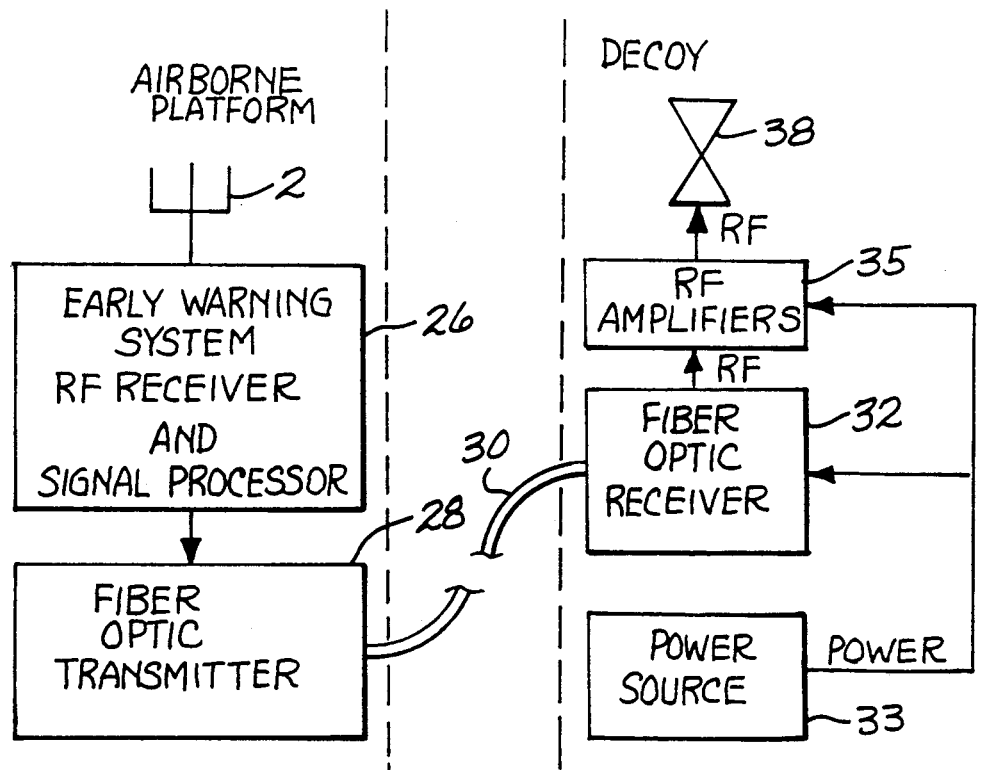
FIG. 2 is a generalized schematic diagram of a system for transmitting RF signals over an optical fiber to an antenna in accordance with the invention.

FIG. 2 is a schematic diagram that illustrates the generic components of the system of the invention. The elements carried on board the airborne platform are shown in the left of FIG. 2 and include a wide band receiving antenna 2, an early warning system radio frequency receiver and signal processor 26, and a fiber optic transmitter 28. The receiver and processor 26 may include, for example, the elements 3-8 and 10 and/or 12 of FIG. 1. The fiber optic transmitter 28 would usually include a laser diode. The elements of the system carried on board the decoy are shown in the right hand portion of FIG. 2 and include a fiber optic receiver 32. An optical fiber 30 forms a transmission link between the transmitter 28 and the receiver 32. The receiver 32 normally comprises a photodetector, such as a photodiode. It converts the optical signal received from the optical fiber 30 into a radio frequency signal which is amplified by one or more amplifiers 35 and then transmitted by a transmitting antenna 38. The amplifiers 35 or associated elements provide impedance matching of the receiver 32 and the antenna 38 to help minimize the loss of RF signal. Tho use of an amplifier or amplifiers 35 is necessary in most situations in order to attain a desired power level of the signal transmitted from the antenna 38. However, it is within the scope of the invention to omit the amplifiers 35 if operational requirements permit. The term "optical receiver," as used herein, is intended to include the amplifier(s), if present, as well as the photodetector 32.

The receiver 32 and amplifiers 35 are powered by a power source 33. The type of power is normally direct current electrical power, but could also be alternating current power. The power source 33 can be one or more batteries located on board the decoy. However, preferably the ultimate power source is located on board the airborne platform and comprises a source of intense light. The light is optically transmitted from the platform to the decoy and is converted into electrical power on board the decoy, as described further below. In such case, the power source component 33 on board the decoy would be, for example, a photovoltaic converter.

The output of the subsystem 26 is an RF retransmission signal generated in response to a selected hostile radar signal. (The term "RF", as used herein, is intended to be understood in its broad sense as including the full spectrum of radio frequencies from about 1 megahertz (MHz) to about 300 gigahertz (GHz).) The retransmission signal is fed from the subsystem 26 to the transmitter 28 which generates an optical signal representative of the retransmission signal. The generation of the optical signal may be carried out, for example, by directly modulating a laser diode 28 with the RF retransmission signal. Current technology permits frequencies of twenty gigahertz to be transmitted using this method. The frequency range can currently be extended to forty gigahertz by indirect modulation. This is more than adequate to cover at least most operational situations since most military radars currently operate in bands within the frequency range of 0.2 to 18.0 GHz. Whatever technique is used to generate the optical signal, the generated signal is transmitted over the optical fiber 30 to the optical receiver 32 on board the decoy. The optical signal is converted into an RF signal by the receiver 32, amplified by the amplifiers 35, and retransmitted by the antenna 38 to the selected hostile radar.

Figure 3:
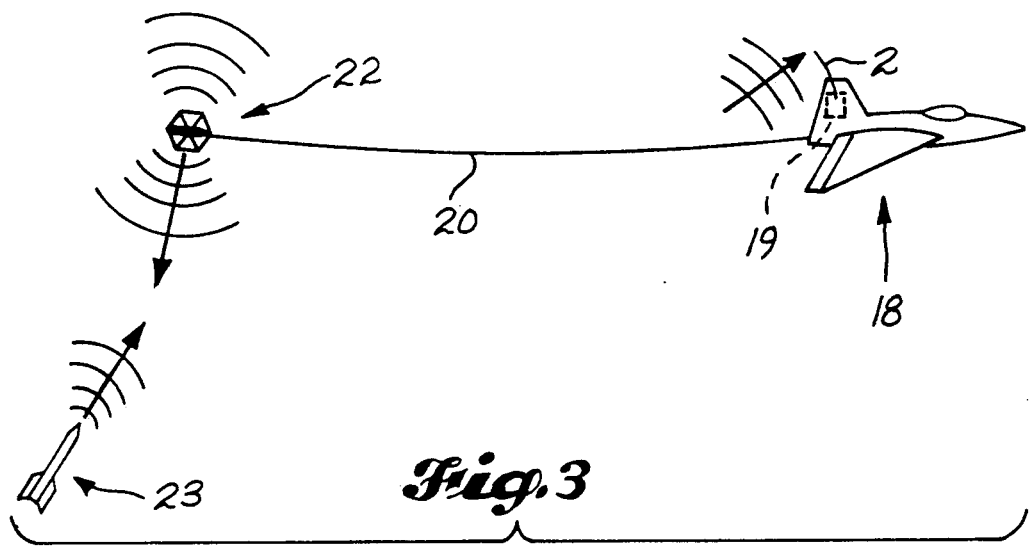
FIGS. 3 and 4 are schematic pictorial views of an aircraft and a towed decoy repeater, illustrating the reception and retransmission of two types of hostile radar signals in accordance with the invention.
Figure 4:
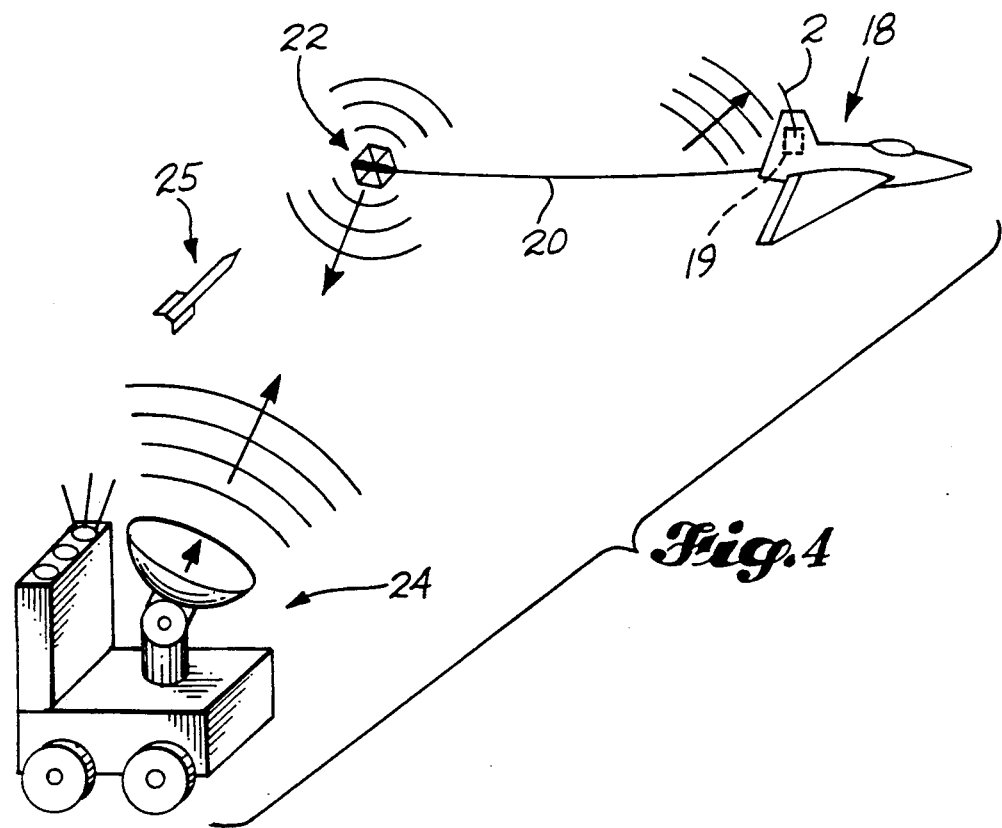

FIGS. 3 and 4 are simplified pictorial views illustrating a basic aspect of the invention in which there is a single decoy 22. As shown in FIGS. 3 and 4, an aircraft 18 is towing a decoy 22 by means of a tow line 20. A receiving antenna 2 and a receiving and processing subsystem 19, both discussed above in connection with FIGS. 1 and 2, are carried on board the aircraft 18. The tow line 20 forms a cable link interconnecting the aircraft 18 and the decoy 22. This link includes a fiber optic component, such as the optical fiber 30 shown in FIG. 2, for optically transmitting the processed retransmission signal from subsystem 19 to the decoy 22. The arrows and arcuate wave lines in FIG. 3 represent the hostile radar signals from an active air-to-air missile 23 received by the antenna 2 on board the aircraft 18, and the signal retransmitted from the decoy 22 to the missile 23 to confuse the missile 23 and cause it to lock onto the decoy 22. Similarly, the arrows and arcuate lines in FIG. 4 represent the hostile radar signals from a ground based launcher and missile guidance radar 24, and the signal retransmitted from the decoy 22 to the radar 24. FIG. 4 also illustrates a passively homing surface-to-air missile 25 launched in response to the retransmitted signal and guided by the radar 24 toward the decoy 22.

The RF energy radiation from the decoy transmission antenna mimics the reflected return from the defended aircraft 18 to confuse the hostile radar, as illustrated in FIGS. 3 and 4. In the practice of the invention, the efficiency of the transmission of RF energy over the fiber optic component of the tow cable 20 reduces as the bandwidth of the energy is made broader. Therefore, if a decoy 22 is to be used in situations which require relatively high power retransmissions from the decoy 22, the decoy 22 is preferably designed to cover only a single radar band. If lower power transmissions will be adequate, a broadband decoy 22 which covers several radar bands may be used.

The transmitting antenna is an important element of the decoy. Several antenna configurations may be used. The choice of antenna depends in large part on the requirements for frequency bandwidth and radiation pattern of transmitted RF signals. FIGS. 5A, 5B, and 5C illustrate three possible antenna configurations. The antenna shown in FIG. 5A is a dipole 38A with a drive point D. The two halves of the dipole 38A may form a housing for the decoy. Dipole antennas have broad side radiation patterns and reasonable bandwidth. Their bandwidth is a function of their length to diameter ratios. To be efficient radiators, dipole antennas should be one-half wavelength or more in size. For the widely used radar bands from 2.0 to 18.0 GHz, the wavelength is six inches to two-thirds inch. Therefore, a decoy with a one-half wavelength dipole, as shown in FIG. 5A, could be no longer than a pencil with a diameter of about one-half inch or less.

FIG. 5B shows a novel type of simulated biconical dipole antenna 38B. Its typical broad side radiation pattern is illustrated in FIG. 5D. The antenna structure is described further below in connection with FIGS. 15-18. Spiral antennas can be designed to operate over large frequency bands. They must be one-third to one-half wavelength in diameter to be efficient radiators. This corresponds to 5 centimeters to 0.5 centimeters for the widely used radar bands from 2.0 to 18.0 GHz. The spiral antenna 38C shown in FIG. 5C radiates in the end direction away from the protected airborne platform, as illustrated in FIG. 5E. It is a spiral wrapped as a helix over a cavity. This helix variation accomplishes some lowering in the transmitted frequencies and broadening of the radiation pattern.

The antennas shown in FIGS. 5A and 5C and other antenna configurations may be used in the decoy consistently with the spirit and scope of the invention. However, the currently preferred form of the antenna is a simulated biconical dipole, such as the antenna 38B shown in FIG. 5B. This type of antenna is particularly desirable because it allows the size and weight of the decoy to be minimized and, at the same time, allows operation of the decoy over wide frequency bands. The antenna configuration of FIG. 5B is further illustrated in FIGS. 15-17. FIGS. 19-22 illustrate another simulated biconical dipole configuration which is presently the most preferred configuration.

In general, a biconical dipole can be designed to operate over a wide frequency band. To achieve this broadband performance, the cone angle must be greater than 45° and preferably 60 to 90°, and the cone length must be at least about one-half of the wavelength corresponding to the lowest operating frequency. For a conventional biconical dipole, these requirements would result, for example, in an antenna configuration with a length of six inches and a diameter of six inches for a low operating frequency of one gigahertz. The six inch diameter is quite large in light of the invention's goal of very small, lightweight, low-drag decoys. However, most radar threats are in the 6-18 GHz band allowing the antenna to be scaled down by a factor of 6.

The preferred embodiments of the antenna of the invention have novel configurations to reduce the size of the antennas and provide aerodynamic stability, while simulating biconical dipoles and maintaining the desirable wide frequency band characteristics of biconical dipoles. In each of the two preferred embodiments, a plurality of fins simulates one-half of the bicone The fins simulate a cone having a forwardly-pointing apex.

FIGS. 15-17 illustrate an embodiment 22A of the decoy that incorporates a preferred embodiment 100 of the antenna. The antenna 100 has the same type of configuration as the antenna 38B shown in FIG. 5B. The decoy 22A is a prototype that was made by the applicants for testing purposes. The decoy 22A includes a housing 96, 98 formed by a sheath 96 and nose cone 98 made from a plastic dielectric material. The forward tip of the tapered nose cone 98 receives the tow line 20 Components are mounted within the housing 96, 98 for receiving the optical signal from the tow line 20, converting it to an RF signal, and feeding it to the antenna 100. As shown in FIG. 15, the components include a photodetector 32A, microwave amplifiers 94, and batteries 34. These components are shown for the purpose of illustration and because they were used in the actual prototype. Other component configurations could also be provided. In particular, the preferred configuration shown in FIGS. 13 and 14 and discussed below could be provided.

The aft half of the antenna 100 comprises four triangular metal fins 108. Each of the four fins 108 may be formed separately and then soldered to the other fins to form the cross-shaped configuration best seen in FIG. 17. Alternatively, two of the fins may be formed from a single thin metal plate to which the other two fins are then soldered. The forward half of the antenna 100 is formed by a truncated cone 102 which has a cylindrical portion 104 and a rear conical portion that terminates in a rearwardly-pointing apex 105. The apex 105 is aligned with the forwardly-pointing apex 110 of the aft fin assembly. A dielectric sheath 112 mechanically connects the two halves of the antenna 100. The sheath 112 has longitudinal slots 114 through which the fins 08 extend radially. The forward end portion 106 of the truncated cone 102 has a reduced diameter and is received into the aft end of the housing sheath 96 to mechanically connect the truncated cone 102 to the decoy housing 96, 98. Alternatively, the forward end of the truncated cone could be a forwardly pointing cone with the components 32A, 34, 94 being housed within the truncated cone. Referring to FIG. 15, the two halves of the antenna 100 are connected electrically through a coaxial transmission line 116. The line 116 extends from the output end of the component package housed in the sheath 96 to the antenna 100. The outer conductor of the line 116 is electrically connected to the truncated cone 102. The center conductor 118 of the line 116 is soldered to the apex 110 of the fin assembly.

Figure 18:
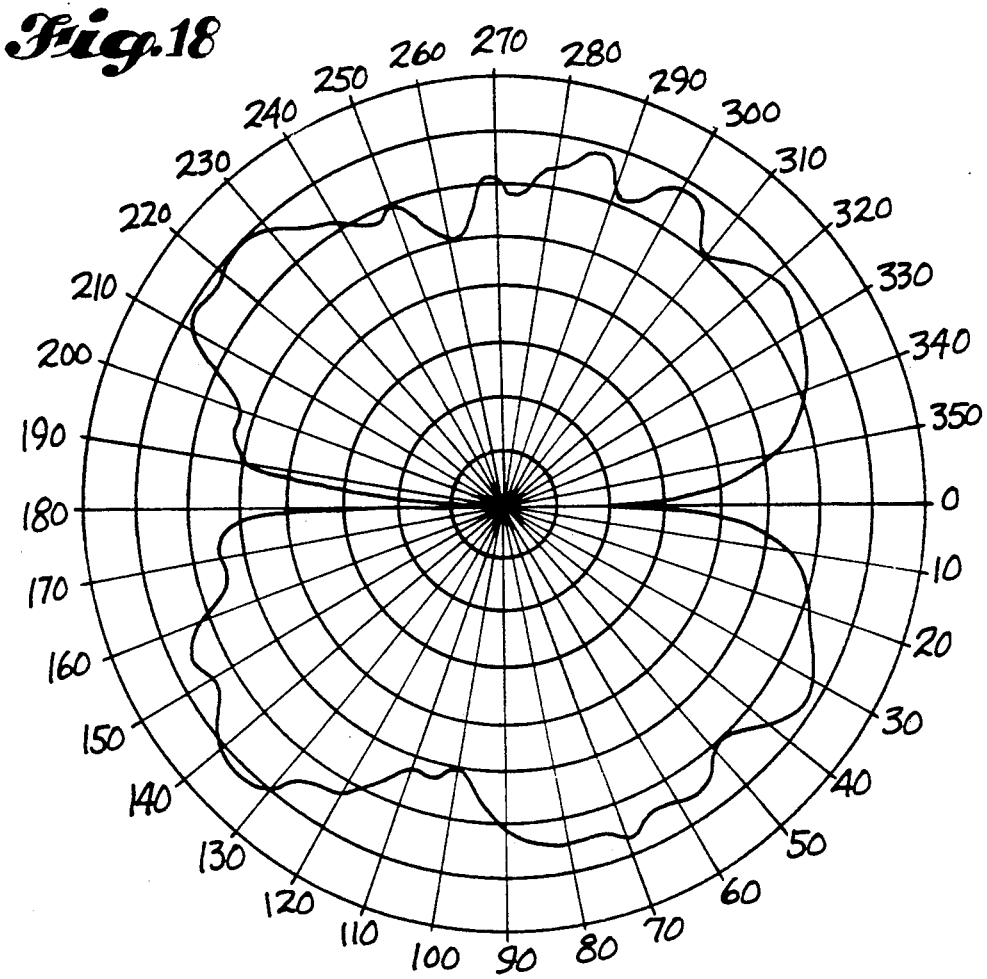
FIG. 18 is a graph illustrating the transmission pattern of the decoy shown in FIG. 15.

The antenna 100 simulates the performance of a biconical dipole. The aft fin assembly approximates a cone. The forward truncated cone portion operates as a true bicone at all frequencies for which the forward to aft length of the cone is greater than a quarter wavelength. For a configuration in which the cylindrical portion of the truncated cone 102 has a diameter of 1.5 inches, the lower frequency limit for performance as a bicone is about four GHz. At lower frequencies, the truncated cone 102 acts as a "fat" dipole, which is also a broadband antenna. Testing of the decoy prototype has shown that the antenna 100 performs well over a range from 0.5 GHz to 10.0 GHz, a 20:1 bandwidth. The quality of the performance was good in respect to both radiation patterns and impedance. FIG. 18 is a graph of an actual radiation pattern from the antenna 100 at a frequency of 3.0 GHz. To the best of the applicants' knowledge, the performance of the antenna 100 far exceeds that of any known antennas of comparable size. Thus, the antenna 100 is highly desirable for use on a small decoy. Another advantage of the structure illustrated in FIGS. 15-17 is that the positioning of the fins on the tail end of the decoy 22A maintains favorable aerodynamic (low drag) performance. In addition, the fins can be used to stabilize the decoy 22A in flight.

The second preferred embodiment of the antenna of the invention is shown in FIGS. 19-22. This embodiment makes it possible for the decoy to be even thinner than the decoy 22A shown in FIGS. 15-17. In the second embodiment, the antenna 124 has two sets of fins, with each set being arranged to simulate a cone to produce an overall configuration simulating a biconical dipole. Referring to FIGS. 19-22, the decoy 22B has a pencil-thin body or housing 120, which terminates at its forward end in a nose cone 122 to which the tow line 20 is attached. The antenna 124 is preferably manufactured from thin plates, such as copper clad dielectric boards 130 of the type used in the manufacture of printed circuits. The boards 130 are etched to remove portions of the copper cladding. The etched portions 34 have the copper removed therefrom and consist solely of the dielectric substrate. These dielectric portions 134 maintain the structural continuity of the boards 130 between the remaining conductive portions 132 and thereby support the conductive portions 132. The four etched boards 130 are secured together to form a spoke-like configuration, as shown in FIG. 22. In this configuration, the boards 130 extend along and radially outwardly from the longitudinal axis X of the decoy 22B. The four parts of the aft half 126 of the simulated bicone are soldered together, as are the four parts of the forward half 128. Following the etching and soldering, the copper clad portions 132 form fins that simulate a full biconical antenna. The aft and forward halves 126, 28 form aligned forwardly-pointing and rearwardly-pointing apexes 127, 129, respectively. The forward half 128 is electrically connected to the body 120 of the decoy 22B, and the aft half 126 is electrically connected to a separate conductor. The positioning of the body 120 with its aft end at the rearwardly-pointing apex 129 of the forward half 128 avoids the need for a coaxial feed line. The overall configuration of the decoy 22B provides a strong small and lightweight mechanical package which integrates the two halves 126, 128 of the antenna 124 with the decoy body 120.

Another feature of the invention that contributes to the small size and light weight of the decoy is the inclusion, in the cable link 20 between the protected platform 18 and the decoy 22, of first and second fiber optic components. The first component optically transmits radio frequency energy to the decoy 22 for retransmission by the decoy antenna 38. The second component optically transmits power to the decoy 22. This feature permits the elimination of batteries on board the decoy 22 and, thereby, provides a significant reduction in the weight of the decoy 22. The very lightweight decoy 22 can be towed by a tow line 20 which consists at least substantially entirely of lightweight optical fiber. No auxiliary strengthening cables are required. The reduction in the weight of the cable link and the decoy 22 and the minimal size of the decoy 22 permit a single platform 18 to tow multiple decoys to carry out the multiple decoy deception techniques described below.

Figure 13:
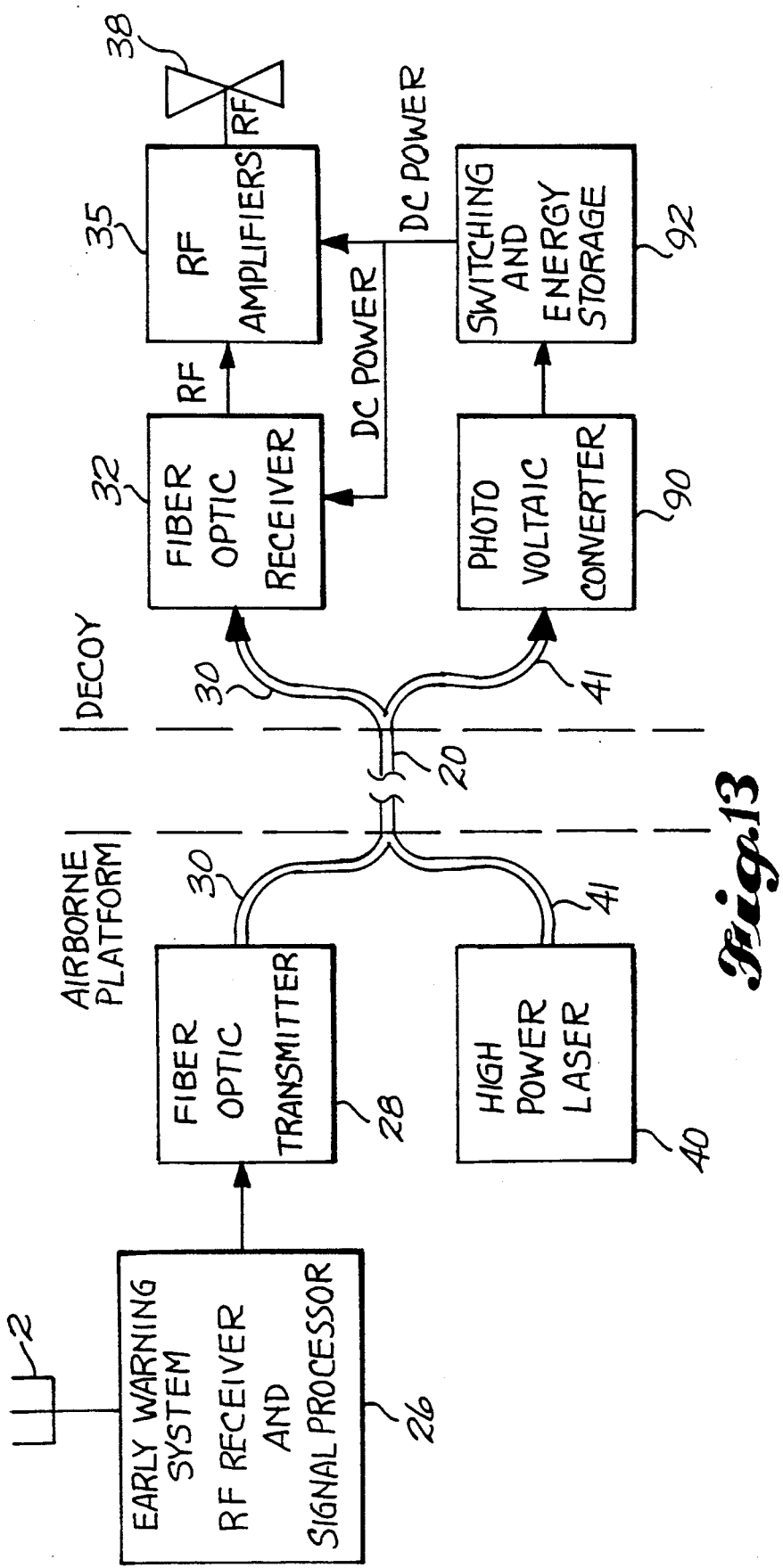
FIG. 13 is a block diagram of the preferred embodiment of the invention.

FIG. 13 illustrates the basic elements of a system in which direct current power is transmitted optically over a fiber optic component of a cable link 20 from the protected airborne platform to a decoy. The components on board the platform include the receiver and processor subsystem 26 and fiber optic transmitter 28 shown in FIG. 2 and discussed above. They also include a high power laser 40 that generates intense light to provide a power source for the decoy. The intense light from the laser 40 is optically transmitted over the second fiber optic component 41 of the cable line 20 to the decoy. As shown, the transmitter power is direct current power. It is anticipated that direct current power will normally be used in the practice of the invention, but other forms of power, such as alternating current power, could also be used.

On board the decoy, the input from the first fiber optic component 30 is converted into an RF signal, amplified, and retransmitted to the hostile radar, as described above in relation to FIG. 2. The power signal from the second fiber optic component 41 is converted into an electrical voltage by a photovoltaic converter 90. Direct current (DC) electrical power is fed through a switching and energy storage circuit 92 from the converter 90 to the receiver 32 and the amplifiers 35. This provides DC bias to power the receiver 32, and also provides power to the amplifiers 35. The overall result is the capability of an extremely small and lightweight decoy to transmit an RF signal to hostile radar at a reasonable power level.

FIG. 14 is a schematic diagram showing the elements on board the decoy in more detail. As shown, the first and second fiber optic components 30, 41 are separate fibers joined together in the cable link 20. Inside the decoy, the two components 30, 4 are separated. The power-transmitting second component 41 is directed to the photovoltaic converter 90, which comprises a plurality of series-connected photovoltaics (photocells) 90A to achieve the proper voltage to power the RF amplifiers 35 and the fiber optic receiver 32. The energy generated by the photo cells 90A of the converter 90 is fed to the switching and energy storage circuit 92 where it is stored in a storage capacitor 92A. In order to conserve energy, the stored power is supplied to the amplifiers 35 only when it is needed. A power switching transistor 92B is used to turn the bias to the amplifiers 35 on and off. The bias switch provided by the transistor 92B is activated to supply energy to the amplifiers 35 when a transmittal detector 92C senses that there is a retransmission pulse. The RF pulse detector 92C generates a very low-power signal which is amplified by a driver amplifier 92D to drive the transistor 92B. The activation of the transistor 92B also provides DC power to the receiver 32. Power to the receiver 32 could also be provided continuously without the intervention of the switching transistor 92B since the power requirements of the receiver 32 are very low. The circuit 92 may also include elements in addition to and/or different from those shown in FIG. 14, such as elements for converting voltage.

Still referring to FIG. 4, the first fiber optic component 30 is coupled to the fiber optic receiver 32. The receiver 32 comprises a photodiode 32B coupled to a buffer amplifier 32C. The photodiode 32B converts the optical retransmission signal from the fiber optic component 30 into an RF signal which is amplified by the buffer amplifier 32C. The buffer amplifier 32C also provides the proper output impedance for the RF amplifiers 35. The buffer amplifier 32C is coupled to the RF amplifiers 35 by a directional coupler. The RF amplifiers 35 include a plurality of amplifiers 35A, 35B, 35C, as shown in FIG. 14. The stages of amplifier gain provided by the individual amplifiers 35A, 35B, 35C are usually required to amplify the relatively weak signal from the receiver 32 to the power level desired to be radiated from the transmitting antenna 38.

The cable link with the two fiber optic components may take various forms One way in which the two fiber optic components may be provided is in the form of two separate, independently deployable, optical fibers. However, it is preferable for the two components to be combined into a signal cable link. Two embodiments of such a single cable link, in which the fiber optic components comprise two separate optical fibers joined to be deployed together, are shown in FIGS. 9 and 10. Referring to FIG. 9, the fiber optic cable 52 shown therein includes a first optical fiber 54, 56 with a known structure having a glass core 56 and glass cladding 54 with different indices of refraction. The cable 52 further comprises a second separate optical fiber 58, 60 with a larger core 60 and cladding 58. The RF and power signals are carried by the smaller and larger cores 56, 60, respectively. The two fibers 54, 56 and 58, 60 are joined together by a plastic nonconductive, nonstructural tight buffer 62. In this arrangement, the optical fibers 54, 56 and 58, 60 are the structural elements that carry essentially all of the loads imposed by towing the decoy.

FIG. 10 shows a cable link 66 with optical fibers 68, 70 and 72, 74 of similar size and configuration to the fibers 54, 56 and 58, 60 shown in FIG. 9, including the respective relatively small and larger cores 70, 74. The fibers 68, 70 and 72, 74 are embedded in a filler 76 which is, in turn, surrounded by a plastic sheath 78. In this embodiment, the sheath 78 has a reinforcing, as well as a protective, function, i.e. the towing loads are carried by the sheath 78. Alternatively or additionally, strain forces can be absorbed by a separate non-metallic line inside the sheath 78. The filler 76 is a loose buffer that decouples the fibers 68, 70 and 72, 74 from the strain on the sheath 78 and/or the additional strain component.

Figure 11:
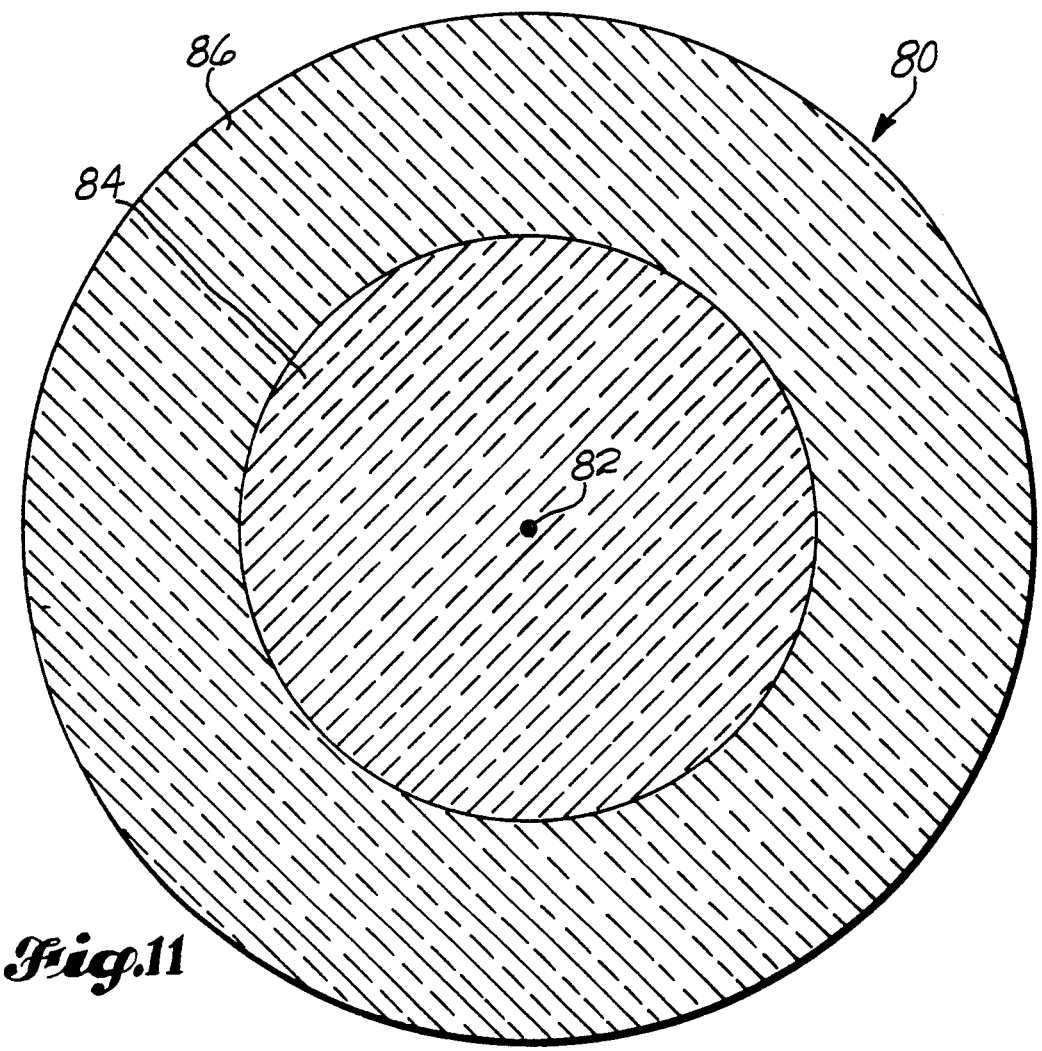
FIG. 11 is a cross-sectional view of the preferred embodiment of the fiber optic cable link.

The most preferred embodiment of the power transmitting cable link is shown in FIG. 11. In this embodiment, the link is formed by a coaxial optical fiber 80 having a small inner core 82, and a large outer core 84 surrounding and coaxial with the inner core 82. The first and second fiber optic components comprise these inner and outer cores 82, 84, respectively. The light modulated by RF, i.e. the optical signal representing the RF retransmission signal from the platform to the decoy, is transmitted in the inner core 82. High intensity light at a different wavelength is transmitted in the outer concentric core 84 to provide the decoy with DC power. The outer core 84 is surrounded by glass cladding 86. The fiber 80 may also have a plastic jacket (not shown) which is preferably of minimal thickness and weight to merely serve to protect the fiber 80 from the environment. The fiber 80, itself, serves as the structural link between the platform 18 and the decoy towed thereby. When a coaxial optical fiber, such as the fiber 80 shown in FIG. 11, is used to transmit the RF retransmission and power signals to the decoy, the two signals must be different wavelengths to avoid interference, and an optical separator is required to separate the signals inside the decoy. The separator may be a commercially available wavelength division multiplexer. The separator is not shown in FIG. 14 because it is not needed when the components 30, 41 are separate fibers.

Figure 12:
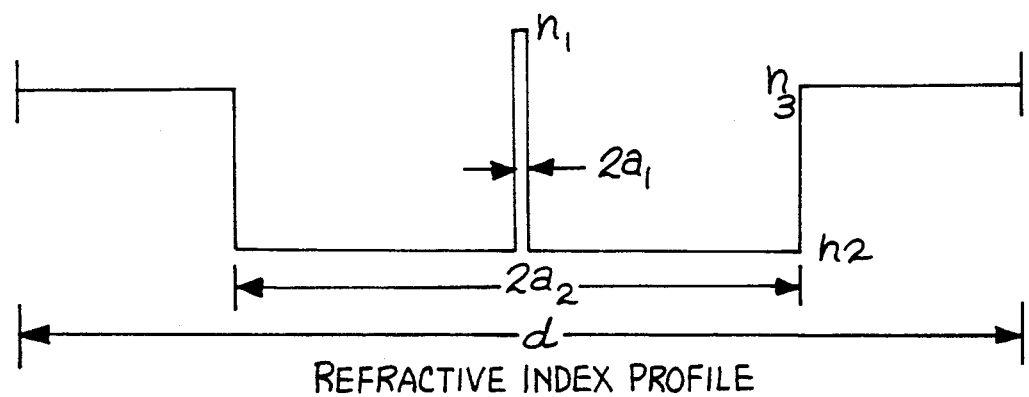
FIG. 12 is a diagram showing a typical refractive index profile of the coaxial optical fiber shown in FIG. 12.

FIG. 12 is a diagram of the refractive index profile of the coaxial optical fiber 80 shown in FIG. 11. In FIG. 12, n is the index of refraction of the small inner core 82, $n_2$ is the index of refraction of the large outer core 84, $n_3$ is the index of refraction of the cladding 86, d is the diameter of the overall fiber 80, and a and $a_2$ are the radii of the inner and outer cores 82, 84, respectively. As shown, the refractive index $n_1$ of the small inner core 82 is relatively higher than the refractive $n_2$ of the concentric outer core 84. The difference in the indices of refraction confines the RF retransmission-signal-carrying light to travel in the small inner core 82. Similarly, the difference in the indices of refraction $n_2$, $n_3$ between the outer core 84 and the cladding 86 confines the high power light to travel in the large outer core 84. The structure of the fiber could be varied to achieve the same result by providing the outer core 84 with a high index of refraction relative to the inner core 82 and cladding 86, rather than a relatively low index of refraction $n_2$, as shown in FIG. 12.

The advantages of the feature of optically transmitting both the RF signal and DC power are considerable and are maximized by the preferred embodiment shown in FIG. 11. The combination of the decoy and the towing cable link has very low mass and volume. This facilitates deployment of the decoy and helps minimize the physical storage space required on the platform for the cable link and decoy. The deployment is further facilitated by the single-fiber construction of the link. The decoy and its link also have small physical cross sections to provide low drag and low visibility to hostile assets. The cable link itself may be entirely non-metallic with a low shear strength. This gives it zero radar reflectivity and prevents it from being a hazard to aircraft in flight or personnel on the ground. If encountered by an aircraft, the link will simply shear off without harm to the airoraft. If it is discarded or broken while in flight, the link will not short power transmission lines.

Figure 19:
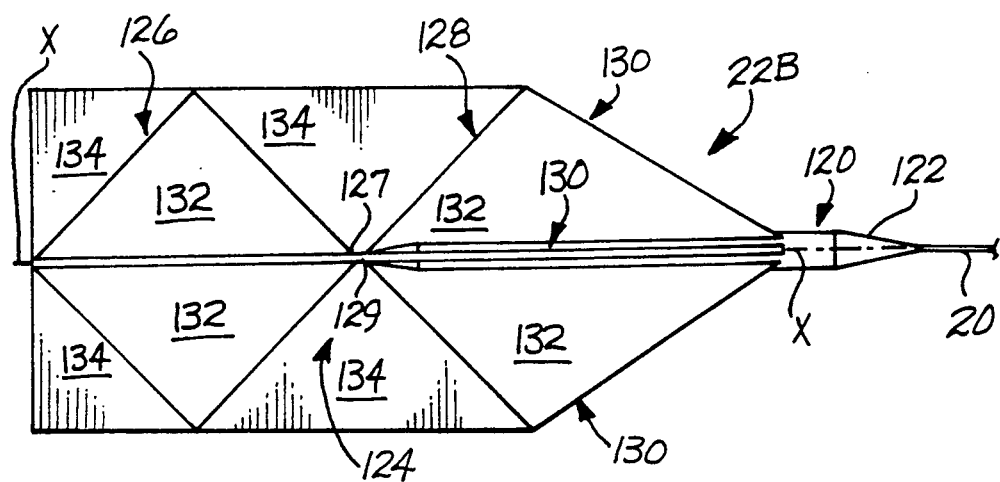
FIG. 19 is an elevational view of the currently preferred embodiment of the decoy.

The reduction in the size and weight of the decoy may be maximized by the use of the combination of monolithic microwave integrated circuits in the decoy, optical transmission of direct current power to the decoy, and incorporation into the decoy of a small-sized antenna, such as one of the antennas shown in FIGS. 5 and 19. A decoy with these features can easily be towed by a fiber optic cable For example, in the decoy configuration 22B shown in FIG. 19, the decoy body 120 could be reduced to the size of a pencil. The diameter of the decoy body 120 would be less than one centimeter. The drag on a disk one centimeter in diameter moving through the air at Mach 1 at sea level would be about 1.3 pounds. The cone shape of the decoy body 120 results in a drag less than this calculated drag of a disk. An ordinary commercially available optical fiber has a tensile strength of about 30 pounds, which is more than sufficient for absorbing the drag force. This tensile strength is calculated on the basis of a 100 kpsi proof strength and a 500 micron diameter of a common cladded fiber.

As mentioned above, the small size and light weight of the decoy of the invention permits a plurality of decoys to be simultaneously towed by an airborne platform. FIG. 6 illustrates an aircraft 18 towing four decoys 22 in accordance with the method of the invention. Each decoy 22 is towed by its own cable link 20. The decoys 22 are towed at varying distances from the aircraft 18. Each decoy 22 receives an optically transmitted radio frequency signal from the aircraft 18 for retransmission to a hostile radar 24. For purposes of reference, the decoys 22 are numbered one through four in FIG. 6. In FIG. 7, the power levels of decoys one through four for accomplishing angle gate deception of the hostile radar 24 are shown. The arrow in FIG. 6 indicates the resulting movement of the apparent target centroid. The retransmission signals from the decoy antennas are transmitted in sequence from decoy to decoy to accomplish the deception. If the tracking radar 24 illuminates the defended aircraft 18 from a side, e.g. a 30 to 150° aspect angle, the activating of the plurality of decoys in sequence creates a false target that appears to the tracking radar as a target wandering in angle. The deception can be enhanced by dynamically varying the power levels of the transmitting antennas. This can be accomplished by controlling the RF modulation power of the laser diodes on board the aircraft 18. The power is gradually increased and decreased sequentially from one decoy to the next to achieve a smooth transition from one location to the next in the apparent position of the false target.

A multiple decoy deployment can also be used offensively to create a plurality of false targets. This deception technique is illustrated in FIG. 8. The decoys 22 are deployed at a variety of distances from the defended aircraft 18, and the timing and level of the transmissions from the decoys 22 simulate a squadron of aircraft. This can be used to deceive the enemy into committing significant forces against a single actual target. FIG. 8 illustrates the simultaneous transmissions from the decoys 22 that appear on the console 48 of a tracking radar 24 as a plurality of false targets 50.

Another technique that may be carried out in accordance with the method of the invention is the transmission of radio frequency signals in different frequency ranges from each of a plurality of decoys. This allows the protection system to confuse radars over an overall range of radar frequencies greater than the frequency range corresponding to any one of the transmitting antennas on the decoys. Each individual decoy can be optimized as to size and performance since its bandwidth can be relatively narrow without limiting the effectiveness of the system. With the appropriate selection of decoys, the system as a whole protects against all hostile radars that might be encountered on a particular mission.

In the case of the use of a plurality of decoys, each of which covers a different radar band or bands, the spacing of the decoys may be large, as illustrated in FIG. 8, or quite small. It is only necessary that the decoys be separated from each other an amount sufficient to prevent their interfering with each other. In the cases of angle gate deception and simulation of a plurality of targets, the decoys need to be deployed at greater distances from each other. This can be accomplished since the small size and light weight of the decoys and the low RF loss rate from the fiber optic links allow the decoys to be deployed at considerable distances from the aircraft 18. For example, it is anticipated that the decoy farthest form the aircraft 18 could be towed at a distance of at least ten kilometers from the aircraft 18.

Although the preferred embodiments of the invention have been illustrated and described herein, it is intended to be understood by those skilled in the art that various modifications and omissions in form and detail may be made without departing from the spirit and scope of the invention as defined by the following claims.

What is claimed is:

1. A system for confusing hostile radar to protect an airborne platform, comprising:
 a receiving antenna on board the platform configured to receive radio frequency signals from hostile radar;
 a processor on board the platform for generating a radio frequency retransmission signal in response to said radio frequency signals;
 a laser transmitter on board the platform linked to said processor to generate an optical signal representative of said retransmission signal;
 a decoy deployable to be towed by the platform;
 a fiber optic cable interconnecting the platform and said decoy, said cable providing a structural link for towing said decoy and a communications link for transmitting said optical signal to said decoy;
 an optical receiver on board said decoy connected to said cable to receive said optical signal from said cable; and
 a transmitting antenna on board said decoy connected to said optical receiver to transmit a radio frequency signal to said hostile radar in response to said optical signal;
 wherein said transmitting antenna is a simulated biconical dipole in which a plurality of fins simulate one-half of a bicone.

2. The system of claim 1, comprising a plurality of said decoys deployable to be simultaneously towed by the platform.

3. A system for confusing hostile radar to protect an airborne platform, comprising:
 a receiving antenna on board the platform configured to receive radio frequency signals from hostile radar;
 a processor on board the platform for generating a radio frequency retransmission signal in response to said radio frequency signals;
 a laser transmitter on board the platform linked to said processor to generate an optical signal representative of said retransmission signal;
 a decoy deployable to be towed by the platform;
 a fiber optic cable interconnecting the platform and said decoy, said cable providing a structural link for towing said decoy and a communications link for transmitting said optical signal to said decoy;
 an optical receiver on board said decoy connected to said cable to receive said optical signal from said cable; and
 a transmitting antenna on board said decoy connected to said optical receiver to transmit a radio frequency signal to said hostile radar in response to said optical signal;
 wherein said system comprises a plurality of said decoys deployable to be simultaneously towed by the platform.

4. A system for confusing hostile radar to protect an airborne platform, comprising:
 on board the platform, a receiving and signal processing subsystem for receiving radio frequency signals from hostile radar and generating a radio frequency retransmission signal in response to said radio frequency signals, and a laser transmitter linked to said subsystem to generate an optical signal representative of said retransmission signal;
 a decoy deployable to be towed by the platform;
 a cable link interconnecting the platform and said decoy; said link including first and second fiber optic components for optically transmitting said optical signal and power, respectively, to said decoy;
 an optical receiver on board said decoy powered by said power and connected to said cable link to receive said optical signal from said cable link; and
 a transmitting antenna on board said decoy connected to said optical receiver to transmit a radio frequency signal to said hostile radar in response to said optical signal.

5. The system of claim 4, in which said cable link comprises a coaxial optical fiber having an inner core, and an outer core surrounding and coaxial with said inner core; and said first and second fiber optic components comprise said inner and outer cores, respectively.

6. The system of claim 5, in which said coaxial optical fiber has sufficient structural strength to carry essentially all loads imposed by towing said decoy.

7. The system of claim 4, in which said first and second fiber optic components comprise two separate optical fibers joined to be deployed together.

8. The system of claim 7, in which said separate optical fibers are joined by a buffer and together provide a structural link between the platform and said decoy for towing said decoy.

9. The system of claim 7, in which said cable link comprises said separate optical fibers, and a separate strain component to absorb strain forces imposed by towing said decoy.

10. The system of claim 4, comprising a plurality of said decoys deployable to be simultaneously towed by the platform.

11. The system of claim 10, wherein said transmitting antenna is a simulated biconical dipole in which a plurality of fins simulate one-half of a bicone.

12. The system of claim 4, in which said first and second fiber optic components comprise two separate, independently deployable, optical fibers.

13. The system of claim 4, in which said fiber optic components have sufficient structural strength to carry essentially all loads imposed by towing said decoy.

14. The system of claim 13, wherein said transmitting antenna is a simulated biconical dipole in which a plurality of fins simulate one-half of a bicone.

15. The system of claim 14, comprising a plurality of said decoys deployable to be simultaneously towed by the platform.

16. The system of claim 13, comprising a plurality of said decoys deployable to be simultaneously towed by the platform.

17. The system of claim 5, wherein said transmitting antenna is a simulated biconical dipole in which a plurality of fins simulate one-half of a bicone.

18. A method of confusing hostile radar to protect an airborne platform, comprising:
 providing a plurality of decoys, each having an antenna;
 interconnecting each said decoy with the platform by a cable link including a fiber optic component;
 deploying said decoys to be simultaneously towed by the platform, at varying distances from the platform, by means of said cable links;
 on board the platform, receiving radio frequency signals from hostile radar and processing said signals to generate radio frequency retransmission signals;
 optically transmitting said retransmission signals from the platform to said decoys via said fiber optic components; and
 transmitting, via said antennas, said retransmission signals to said hostile radar.

19. The method of claim 18, comprising deploying said fiber optic components to absorb strain forces imposed by towing said decoys.

20. The method of claim 18, comprising optically transmitting power from the platform to said decoys via said fiber optic components.

21. The method of claim 20, comprising deploying said fiber optic components to absorb strain forces imposed by towing said decoys.

22. The method of claim 18, comprising transmitting, from different ones of said decoys, retransmission signals in different frequency ranges, to cover an overall range of frequencies greater than said frequency range corresponding to any one of said decoys.

23. The method of claim 22, comprising optically transmitting power from the platform to said decoys via said fiber optic components.

24. The method of claim 18, in which the step of transmitting said retransmission signals to said hostile radar comprises creating, by means of said retransmission signals, a plurality of false targets simulating a plurality of aircraft.

25. The method of claim 24, comprising optically transmitting power from the platform to said decoys via said fiber optic components.

26. The method of claim 18, comprising transmitting said retransmission signals from said antennas in sequence to accomplish angle gate deception of said hostile radar.

27. The method of claim 26, comprising dynamically varying power levels of said antennas to enhance said deception.

28. The method of claim 26, comprising optically transmitting power from the platforms to said decoys via said fiber optic components.

* * * * *

UNITED STATES PATENT AND TRADEMARK OFFICE
CERTIFICATE OF CORRECTION

PATENT NO. : 5,136,295

DATED : August 4, 1992

INVENTOR(S) : James G. Bull, Michael de la Chapelle, and Bernard J. Lamberty

It is certified that error appears in the above-identified patent and that said Letters Patent is hereby corrected as shown below:

Column 2, lines 37, 39, 64 and 65, "airoraft" should be -- aircraft --.
Column 3, line 19, insert -- a -- after "to".
Column 3, line 32, "si9nal" should be -- signal --.
Column 4, line 4, "t he" should be -- the --.
Column 5, line 35, "cone With" should be -- cone with --.
Column 7, line 17, "accordance With" should be -- accordance with --.
Column 7, line 63, "antenna 6" should be -- antenna 16 --.
Column 8, line 28, "Tho" should be -- The --.
Column 8, line 57, there is a period after "signal".
Column 10, line 51, there is a period after "line 20".
Column 11, line 8, "fins 08" should be -- fins 108 --.
Column 11, line 63, "portions 34" should be -- portions 134 --.
Colunm 12, line 9, "126, 28" should be -- 126, 128 --.
Column 13, line 5, "30, 4" should be -- 30, 41 --.
Column 13, line 31, "Fig. 4" should be -- Fig. 14 --.
Column 13, line 48, there is a period after "forms".
Column 14, line 43, "12, n" should be -- 12, $n_1$ --.
Column 14, line 44, "n:", first occurrence, should be -- $n_2$ --; and "n:", second occurrence, should be -- $n_3$ --.
Column 14, line 46, "and a and a:" should be -- and $a_1$ and $a_2$ --.
Column 15, line 9, "airoraft" should be -- aircraft --.
Column 15, line 18, there is a period after "cable".

UNITED STATES PATENT AND TRADEMARK OFFICE
CERTIFICATE OF CORRECTION

PATENT NO. : 5,136,295

DATED : August 4, 1992

INVENTOR(S) : James G. Bull, Michael de la Chapelle, and Bernard J. Lamberty

It is certified that error appears in the above-identified patent and that said Letters Patent is hereby corrected as shown below:

Claim 17, column 18, line 25, "claim 5" should be -- claim 4 --.
Claim 28, column 20, line 4, "platforms" should be -- platform --.

Signed and Sealed this

Second Day of November, 1993

Attest:

BRUCE LEHMAN

Attesting Officer  Commissioner of Patents and Trademarks